3,093,360
PILOT VALVE CONTROL REVERSE VALVE
John P. Krouse, Athens, Pa., assignor to Ingersoll-Rand Company, New York, N.Y., a corporation of New Jersey
Filed June 2, 1959, Ser. No. 817,669
6 Claims. (Cl. 253—2)

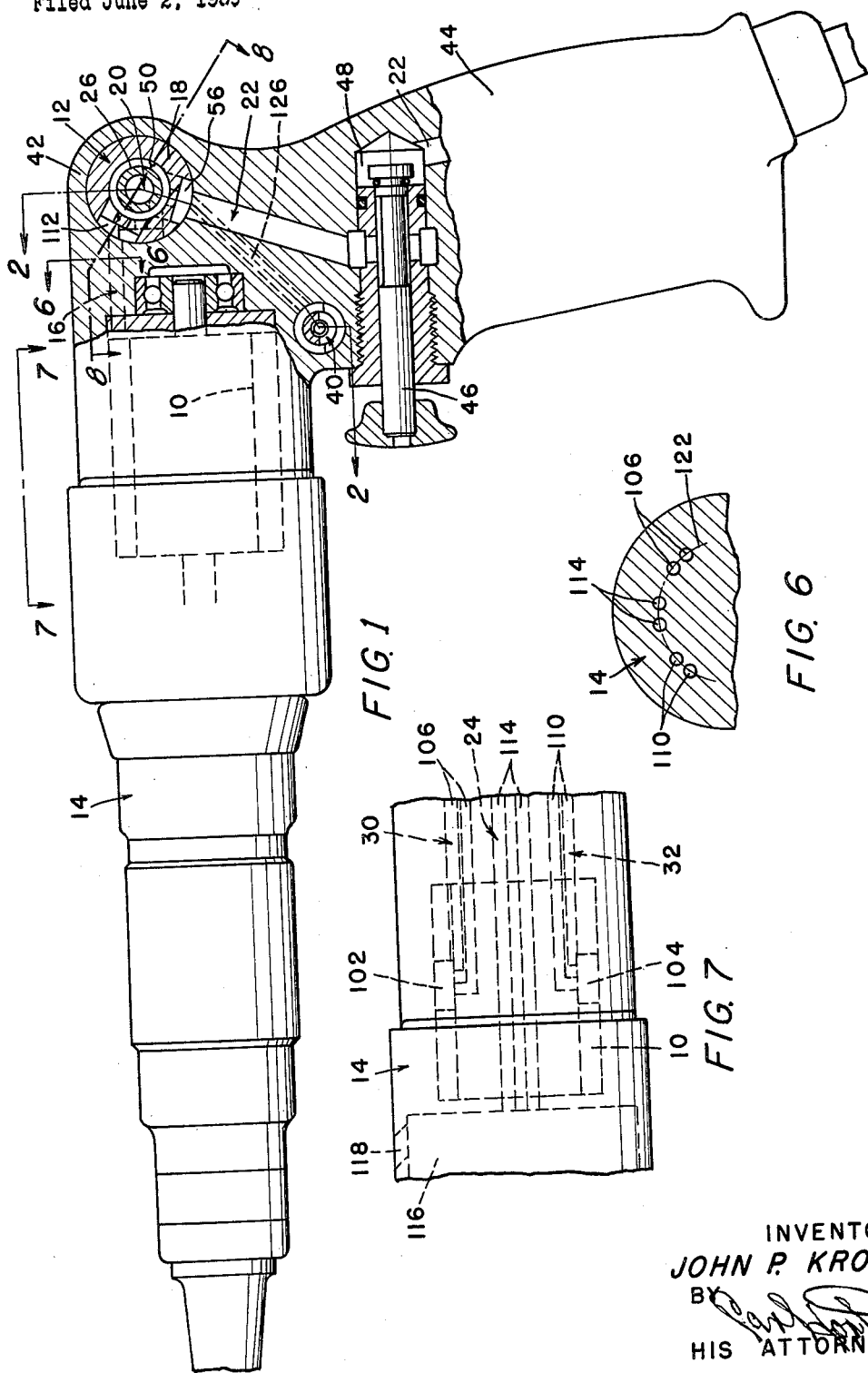

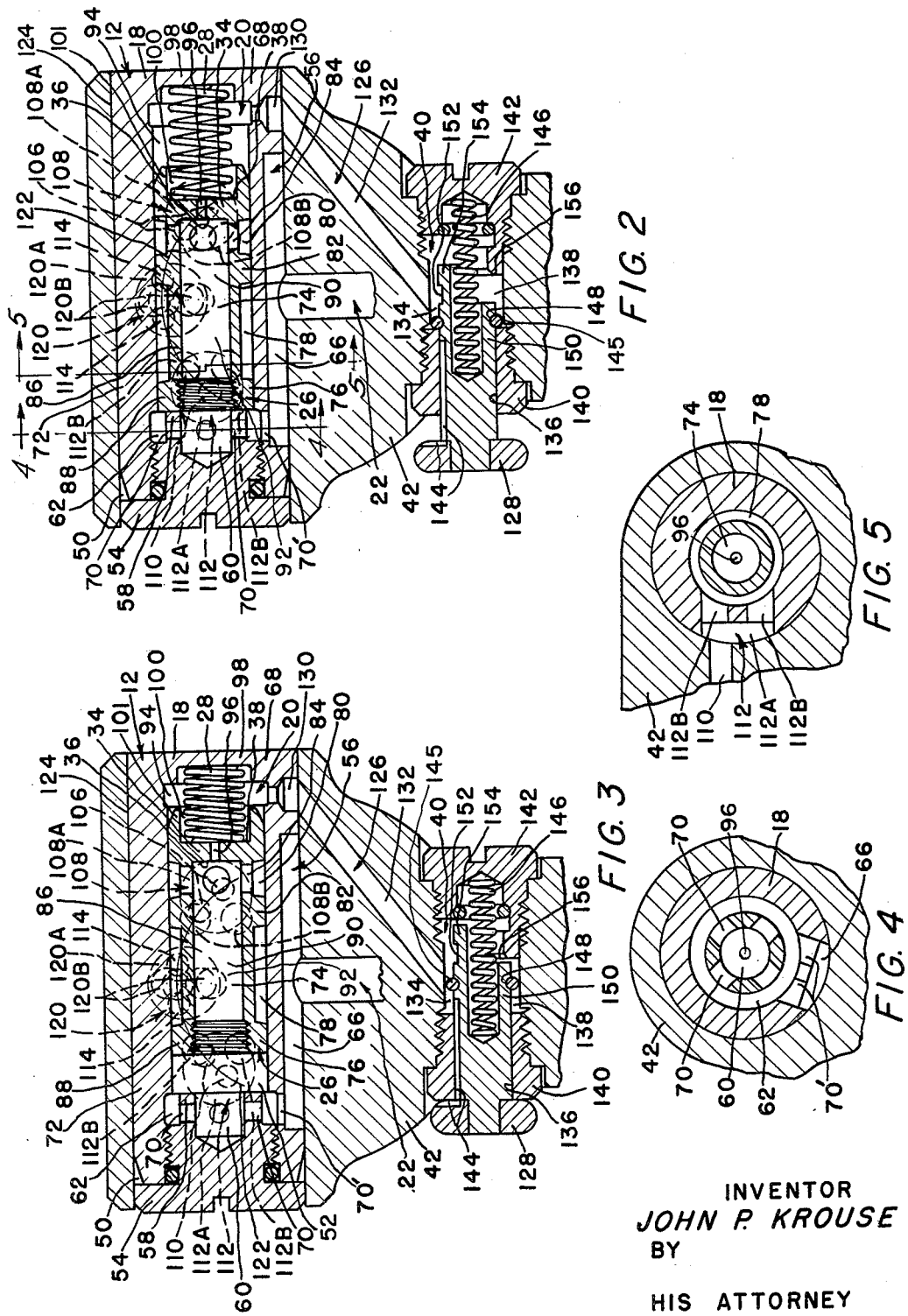

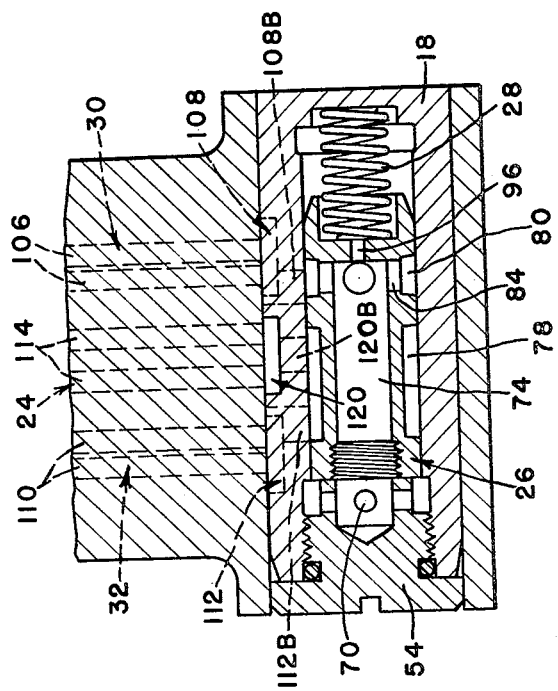
FIG. 8
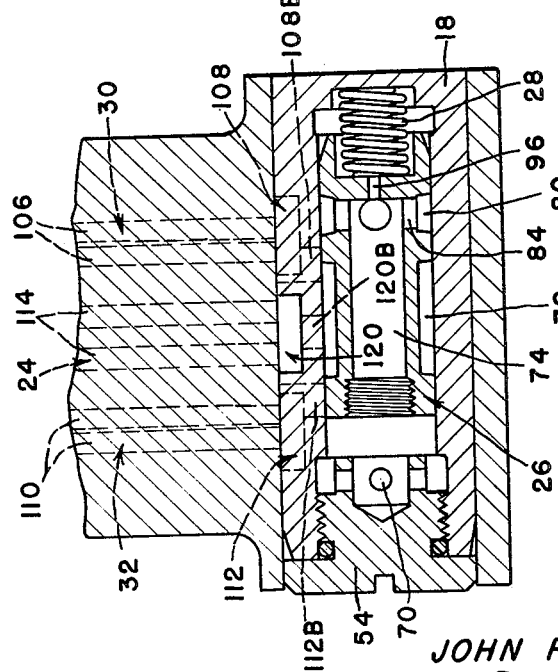
FIG. 9
INVENTOR
JOHN P. KROUSE
HIS ATTORNEY United States Patent Office 3,093,360
Patented June 11, 1963

This invention relates to a reversing valve mechanism, and more particularly to such a mechanism for a fluid driven motor adapted to operate a tool.

One object of this invention is to control the direction of movement of the motor.

Another object of this invention is to provide a tool driven by a fluid operated motor with a simple device for controlling the direction of movement of the motor.

Further objects will become obvious from the following description and drawings in which FIGURE 1 is a longitudinal view partly in section of the tool showing the motor and the valve mechanism therefor.

FIGURE 2 is a sectional view of FIG. 1 taken along the lines 2—2 looking in the direction of the arrows and showing the valve mechanism and the control valve therefor in one operative position.

FIGURE 3 is the sectional view shown in FIG. 2 with the valve mechanism and control valve therefor approaching a second operative position.

FIGURES 4 and 5 are cross-sections of FIG. 2 taken along the lines 4—4 and 5—5, respectively, looking in the direction of the arrows.

FIGURE 6 is a sectional view of FIG. 1 taken along the lines 6—6 looking in the direction of the arrows.

FIGURE 7 is a plan view of FIG. 1 as viewed from the line 7—7 looking in the direction of the arrows schematically showing the fluid motor with conduit means connected thereto.

FIGURE 8 is a cross sectional view taken on the line 8—8 of FIGURE 1 showing the valve mechanism in position for clockwise rotation of the motor, and FIGURE 9 is a cross sectional view similar to FIGURE 8 showing the valve mechanism in position for counterclockwise rotation of the motor.

Referring to the drawings and first to FIG. 1, the fluid motor 10 and the reversing valve mechanism 12 therefor are mounted in the tool 14.

The motor 10 is adapted to drive the tool 14 in opposite directions (not shown), and is of a conventional type in which the direction of movement of such motors is determined by the direction of fluid flow thereinto and exhaust therefrom. Accordingly, the motor 10 includes conduits 16 which alternately serve as inlet and discharge fluid conveying means depending on the direction in which the motor 10 is to be driven.

The reversing valve mechanism 12 controls the direction of movement of the motor 10 by controlling the direction of fluid flow to and from the motor 10, and includes a valve casing 18 having a chamber 20 into which the motor conduits 16 open. In addition, spaced fluid supply and exhaust conduit means 22 and 24, respectively, open into said chamber 20 with the fluid being supplied to the conduit means 22 from a suitable source (not shown) and the exhaust conduit 24 dumping motor discharge fluid to atmosphere.

To cause the motor 10 to move in one direction, the mechanism 12 includes a valve member 26 movable in the chamber 20 in to one position (as shown in FIG. 2 to the left) by a biasing means, such as a spring 28 in the chamber 20, to associate the fluid supply 22 with one of the motor conduits 16, in the preferred form of the invention motor conduit 30, and the exhaust 24 with the other of said conduits 16, motor conduit 32.

In order to move the motor 10 in the opposite or other direction, the valve member 26 is movable into a second position (as shown in FIG. 3 to the right) to associate the fluid supply 22 with the motor conduit 32 and the exhaust 24 with the motor conduit 30. The accomplish this result, the mechanism 12 includes a pressure wall 34 operatively connected to the valve member 26 including interconnected pressure surfaces 36 and 38 thereon subject to the pressure of the motor supply fluid. When the member 26 is in the first position, the pressure across the wall 34 is substantially balanced. When the member 26 is to be moved to its second position, exhaust means 40 operatively associated with said member 26 effects a pressure differential across the wall 34 by exhausting fluid from the pressure surface 38, whereby the biasing action of the spring 28 is overcome to move the member 12 into its second position.

Referring to the details of the invention, the motor 10 is of the reversible rotary type and rotates the tool 14 in either a clockwise or counterclockwise direction. For convenience the motor 10 is shown schematically. Further, when looking at the motor 10 from the back 42 of the tool 14 it rotates in the clockwise direction when fluid is conveyed thereto via conduit 30 and it rotates in the counter clockwise direction when fluid is conveyed thereto via conduit 32.

The tool 14 is a portable screw driver and includes a handle 44 which houses the supply conduit 22 along the length thereof. A finger valve 46 extends across the conduit 22 at an intermediate portion 48 to control the flow of fluid to the motor 10. More particularly, when the valve 46 is depressed supply fluid is allowed to flow to the motor 10; otherwise the valve 46 cuts off the supply of fluid thereto.

The conduit 22 extends into the back portion 42 of the tool 14 opening into a bored hole 50 extending therethrough, and has an axis perpendicular to the longitudinal axis of the tool 14. The valve casing 18 of the mechanism 12 is frictionally fitted therein. And such casing 18 is cylindrical and substantially hollow to define the chamber 20. The chamber 20 has one end portion 52 opened to receive the member 26, and is threaded to receive a complementary threaded cap 54 which closes off such end portion 52 from atmosphere.

A passage 56 made up of several fluid conveying means in both the cap 54 and the casing 18 connects the conduit 22 with the chamber portion 52 which thereby serves as inlet for the supply fluid. More particularly, the cap 54 has a reduced neck portion 58 that extends inwardly into the chamber 20 and which defines a recess 60 therein opened thereto. The outer periphery of the neck 58 defines an annular groove 62 opened at its innermost portion to the chamber 20. And the recess 60 and the annular groove 62 are connected by a plurality of radial bores 70 extending through the neck 58.

To connect the annular groove 62 with the conduit 22, the casing 18 has a longitudinal groove 66 in the lower portion 68 thereof into which the conduit 22 opens intermediate the ends thereof. And radial bores 70' in the peripheral wall 72 of the casing 18 adjacent the neck 58 connect the longitudinal groove 66 with the annular groove 62.

The valve member 26 is of the spool type slidable in the chamber 20 and includes a bore 74 therein opened at the member end 76 to the chamber inlet 52 of the casing 18. The outer periphery 76 of the member 26 defines a pair of annular grooves 78 and 80 spaced apart by an annular flange 82 with radial holes 84 extending through the peripheral wall 86 of the member 26 to connect the groove 80 with the bore 74. The valve member 26 also includes an annular flange 88 located at the member end 76 adapted to cut off the annular groove 78 from the chamber inlet 52.

The pressure wall 34 is an integral part of the member 26 defining the other end 90 of the bore 74 with the pressure surface 36 facing the bore 74 adjacent the radial hole 84. The pressure wall 34 divides the chamber 20 into two portions or compartments 92 and 94, supply and exhaust, respectively, with the supply compartment 92 including the chamber inlet 52. The pressure surface 38 faces the exhaust compartment 94 with the surfaces 36 and 38 connected by a port 96 extending through the wall 34 so that a limited supply of fluid flows from the compartment 92 to the compartment 94.

The spring 28 is housed in the exhaust compartment 94 biased between the casing end wall 98 and the pressure surface 38 in a recess 100 defined by a projection 101 of the wall 34 at the outer periphery 76 of the member 26.

In either of the positions of the valve member 26, as shown in FIGS. 2 and 3, the exhaust conduit 24 is in registry with the annular groove 78.

In its first position (motor 10 rotates in a clockwise direction) the valve member 26 assumes a position in the chamber 20 such that the groove 78 in the member 26 is in communication with the conduit 32 with the flange 88 abutting the neck 58. As a consequence discharge fluid from the motor 10 is exhausted therefrom into the conduit 32, through the annular groove 78 and thence to the exhaust conduit 24. At the same time, the flange 82 cuts off the conduit 30 from the annular groove 78, and the conduit 30 is connected to the annular groove 80 whereby supply fluid flows from the connecting passage 56, through bores 70 and then through the motor bore 74, through the radial holes 84, into the annular groove 80 and thence to the motor 10 via the conduit 30.

In its second position (motor 10 rotates in the counter clockwise direction) the member 26 assumes a position in the chamber 20 with the flange 88 away from the neck 58 such that the peripheral wall 86 of the member 26 uncovers the conduit 32 whereby the conduit 32 opens directly into the compartment 92 and is cut off from the annular groove 78 by the flange 88. This causes supply motor fluid to flow from the connecting passage 56 to the chamber inlet portion 52 and thence to the motor 10 via the conduit 32. At the same time, the conduit 30 is cut off from the annular groove 80 by the flange 82 and is connected to the annular groove 78 whereby discharge fluid from the motor 10 flows through the conduit 30 into the annular groove 78 and thence to the exhaust 24.

In addition to the before-mentioned components of the conduits 30 and 32, such conduits include openings 102 and 104, respectively, in the motor 10 at opposed portions thereof (shown schematically in FIG. 7).

The conduit 30 also includes a pair of motor passages 106 extending longitudinally in the back portion 42 of the tool 14. These passages 106 are opened at one end to the motor opening 102 and at the opposite end to an opening 108 in the valve casing 18. In a similar manner, the conduit 32 includes motor passages 110 extending longitudinally in the back portion 42. These passages 110 open at one end to the motor opening 104 and at the opposite end to an opening 112 in the valve casing 18.

Intermediate the conduit passages just described are a pair of exhaust passages 114 of the conduit 24 extending longitudinally in the back portion 42. These passages 114 are opened at one end to an exhaust chamber 116 in the tool located forward of the motor 10 and connected to atmosphere by an exhaust bore 118. And such passages 114 open at the opposite end to an opening 120 in the valve casing 18.

The openings 108, 112 and 120 are spaced along the casing peripheral wall 72 and extend therethrough opening into the compartment 92. In addition the openings 108 and 112 open into the compartment 92 at opposite end portions thereof with the opening 112 being located at the chamber inlet 52. It is to be noted in conjunction with these openings 108, 112 and 120 that a line through their centers defines an arc 122 with the opening 120 interposed between the opposed openings 108 and 112 and located at the upper portion 124 of the wall 72.

The openings 108 and 112 include bores 108A and 112A, respectively, which extend from the outer periphery 124 of the peripheral wall 72 to some intermediate point therein. Extending through the wall 72 at adjacent portions of the openings 108 and 112 are two pairs of bores 108B and 112B, respectively, which are of smaller diameter than the bores 108A and 112A, respectively, but overlap them.

In a similar manner, the opening 120 in the wall 72 includes a bore 120A which extends from the wall outer periphery 124 to an intermediate point therein. Extending through the wall 72 are a pair of bores 120B which are of smaller capacity than the bore 120A and are coincident therewith.

The exhaust means 40 adapted to effectuate a pressure differential across the pressure wall 34 includes an exhaust conduit 126 of greater capacity than the port 96 and a finger valve 128 for controlling the flow of fluid through the conduit 126.

The conduit 126 includes a port 130 in the lower portion 68 of the valve casing 18 opened at one end to the casing compartment 94, a passage 132 located in the tool back portion 42 opened at one end to the other end of the port 130, a chamber 134 in the back portion 42 into which the other end of the passage 132 opens, and a bore 136 connecting the chamber 134 to atmosphere. The chamber 134 is formed by boring a hole 138 through the back portion 42 spaced from the chamber 20 with an axis parallel thereto, and having stop nuts 140 and 142 threaded into the bored hole 138 at the ends thereof.

The bore 136 extends through the nut 140 with the finger valve 128 slidably extending through such bore 136. The valve 128 includes a groove 144 extending along a portion of the outer periphery of the valve 128 open to atmosphere. In its outward limiting position the groove 144 is kept out of communication with the chamber 134 by a spring 146 biased between the valve 128 and the stop nut 142. A snap ring 145 seated in an annular groove 148 in the valve portion 150 in the chamber 134 is adapted to bear against the nut 140 to limit the outward movement of the valve 128.

The capacity of the valve groove 144 and conduit 126 is greater than the port 96 through the wall 34 so that when communication is established between the chamber 134 and the groove 144 by depressing the valve 128 a pressure differential across the wall 34 will be effected. The pressure differential across the wall 34 thereby effected is sufficient to overcome the biasing action of the spring 28 in the compartment 94 so that the valve member 26 will move into its second position (motor 10 rotates in the counter clockwise direction).

If it is desired to rotate the motor 10 in the counter clockwise direction for a length of time without manually holding the valve 128 in its depressed position, such valve 128 may be rotated in its depressed position until a notch 152 on an extension 154 of the valve portion 150 comes into contact with a projection 156 on the nut 142.

Reviewing the operation of the tool 14 the finger valve 46 is depressed to allow supply fluid to flow to the motor 10 to operate the same which in turn rotates the tool 14.

If the tool 14 is to be rotated in a clockwise direction the flow of fluid through the motor 10 must also be in the clockwise direction. Accordingly, the pressure across the pressure wall 34 of the valve member 26 is substantially balanced and the spring 28 maintains the valve member 26 in its first position abutting the neck 58 (see FIG. 2). Supply fluid flows from the supply conduit 22 through the connecting passages 56, through the bores 70 and then through the member bore 74, through the radial holes 84, through the groove 80 and thence to the motor 10 via conduit 30. Simultaneously, discharge fluid from the motor 10 exhausts therefrom through the conduit 32 into the annular groove 78, through the conduits 114, into the exhaust chamber 116 and thence to atmosphere via exhaust bore 118.

If the tool 14 is to be rotated in a counter-clockwise direction the flow of fluid through the motor 10 must be in the same direction. Accordingly, a pressure differential across the wall 34 is effected by depressing the finger valve 128 to connect the compartment 94 with atmosphere via the exhaust conduit 126 and the finger valve groove 144. The pressure forces acting on the pressure surface 36 are sufficient to overcome the biasing action of the spring 28 and any residual pressure forces acting on the surface 38 whereby the valve member 26 assumes its second position in the chamber 20 (see FIG. 3). Supply fluid flows through the supply conduit 22, connecting passages 56, inlet chamber portion 52, conduit 32, and thence to the motor 10. And discharge fluid from the motor 10 exhausts therefrom through conduit 30, annular groove 78, exhaust conduit 24, exhaust chamber 116, and exhaust bore 118 to atmosphere.

I claim:

1. In combination with a tool having casing, a reversible rotary motor in said casing adapted to be driven by fluid with a pair of fluid openings therein, and spaced fluid supply and exhaust conduit means in said casing for said motor, a valve comprising a valve casing having a chamber in communication with said openings and said supply and exhaust conduit means, a valve member slidable in said chamber and operable to control flow through said motor openings to selectively control the direction of rotation of said motor, spring means in said chamber to bias the valve member into a first position to associate the supply conduit means with one of said openings and the other of said openings with the exhaust conduit means, said valve member having a pair of inter-connected surfaces in said chamber, and valve exhaust means adapted to lower the pressure forces acting on one of said surfaces to overcome the force of said spring means to move the valve member into a second position to reversely associate said openings with said supply and exhaust conduit means.

2. The combination of claim 1 in which the valve exhaust means includes a conduit in the tool open to a portion of the chamber to which said one pressure surface is exposed and a manually operable valve on the tool for controlling the flow of fluid through said conduit.

3. A tool including a casing, a reversible rotary motor mounted in said casing adapted to be driven by fluid and having a pair of openings therein, a valve in said casing including a valve casing having a chamber into which said openings open, spaced fluid supply and exhaust conduit means in said casing for said motor that open into said chamber, a valve member slidable in said chamber to control flow to and from said motor for controlling the direction of rotation of the motor, biasing means in said chamber to bias the valve member into a first position to associate the supply conduit means with one of said openings and the other of said openings with the exhaust conduit means, said member having a wall dividing the chamber into portions with a pair of opposed pressure surfaces connected by a port extending through said wall and across which the pressure forces are substantially balanced when said valve member is in the first said position, and valve exhaust means including a conduit in said casing open to one of said chamber portions and having a fluid flow capacity greater than the capacity of the port, and a valve on the tool to control the flow of fluid through such conduit and movable to exhaust fluid from said conduit whereby the pressure in said one chamber portion is lowered to overcome the biasing action of said biasing means to move the valve member into a second position in said chamber to associate the supply conduit means with the other of said openings and the one of said openings with the exhaust conduit means.

4. A reversing valve mechanism for a reversible rotary motor adapted to be driven by fluid and having a pair of openings which serve selectively and alternately as inlet and discharge fluid conveying means therefor, comprising fluid supply and exhaust conduit means, a valve casing having a chamber therein into which said openings and said exhaust conduit means open along the peripheral wall thereof, and the supply conduit means opens at one end thereof, a valve member slidable in said casing and having a bore therein open at one end to the supply conduit means and having a pair of longitudinally spaced annular grooves defining separate fluid spaces and a radial hole extending through said valve member for connecting one of said spaces with the bore, said exhaust conduit means being in constant registry with the other fluid space, biasing means in the chamber for biasing the valve member into a first position whereby one of said openings is connected to the first said space and cut off from the second said space and the other of said openings is connected to the second said space and cut off from the first said space, said valve member including a pair of inter-connected pressure surfaces in said chamber and across which the pressure forces are substantially balanced when said valve member is in the first said position, and valve exhaust means adapted to lower the pressure of fluid acting on one of said pressure surfaces to move the valve member into a second position in said chamber whereby said one opening is connected to the second said space and said other opening is connected to said supply conduit means and cut off from the second said space.

5. The valve mechanism claimed in claim 4 in which said valve member includes a pressure wall slidable in said casing and which has said pressure surfaces on opposed portions thereof, and a port extending therethrough to connect said pressure surfaces, the other of said pressure surfaces closing the opposite end of the bore.

6. The valve mechanism claimed in claim 5 in which said valve exhaust means includes a conduit open to the chamber portion to which said one pressure surface is exposed and having a flow capacity greater than the capacity of the port extending through the pressure wall, and a valve is provided to control the flow of fluid through said conduit.

References Cited in the file of this patent

UNITED STATES PATENTS

| | | |
|---|---|---|
| 1,791,613 | Clay | Feb. 10, 1931 |
| 2,233,163 | Fosnot | Feb. 25, 1941 |
| 2,337,897 | Jimerson | Dec. 28, 1943 |
| 2,379,483 | Hapgood | July 3, 1945 |
| 2,414,638 | Dobie | Jan. 21, 1947 |
| 2,632,424 | Solmer | Mar. 24, 1953 |
| 2,814,277 | Jimerson | Nov. 26, 1957 |
| 2,828,767 | Barusch | Apr. 1, 1958 |
| 2,843,092 | De Groff | July 15, 1958 |
| 2,846,981 | Kambic | Aug. 12, 1958 |